(12) United States Patent
Fischer et al.

(10) Patent No.: US 6,692,024 B2
(45) Date of Patent: Feb. 17, 2004

(54) FOLDED AIR BAG

(75) Inventors: Kurt F. Fischer, Oxford, MI (US); Mary C. Petit, Shelby Township, MI (US); John G. Bauer, Troy, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 57 days.

(21) Appl. No.: 10/163,319

(22) Filed: Jun. 5, 2002

(65) Prior Publication Data

US 2003/0006597 A1 Jan. 9, 2003

Related U.S. Application Data (63) Continuation-in-part of application No. 09/661,615, filed on Sep. 14, 2000, now abandoned.

(51) Int. Cl.⁷ .............................................. B60R 21/16
(52) U.S. Cl. .................................... 280/743.1; 280/732
(58) Field of Search .............................. 280/743.1, 732, 280/730.1, 728.1

(56) References Cited

U.S. PATENT DOCUMENTS

| | | |
|---|---|---|
| 3,618,977 A | 11/1971 | Klove, Jr. et al. |
| 3,618,978 A | 11/1971 | Klove, Jr. et al. |
| 3,768,830 A | 10/1973 | Hass |
| 4,290,627 A | 9/1981 | Cumming et al. |
| 5,398,968 A | 3/1995 | Emambakhsh et al. |
| 5,425,551 A | 6/1995 | Hawthorn |
| 5,496,056 A | 3/1996 | Dyer |
| 5,513,877 A | 5/1996 | Mac Brien et al. |
| 5,538,281 A | 7/1996 | Patercsak |
| 5,588,668 A | 12/1996 | Emambakhsh et al. |
| 5,636,860 A | 6/1997 | Fischer et al. ........... 280/730.1 |
| 5,636,861 A | 6/1997 | Orsulak et al. |
| 5,884,939 A | 3/1999 | Yamaji et al. |
| 6,029,996 A | 2/2000 | Yoshioka et al. |
| 6,042,144 A | 3/2000 | Murakami et al. |
| 6,158,795 A | 12/2000 | Gray et al. |
| 6,193,271 B1 | 2/2001 | Shimane |
| 6,264,237 B1 | 7/2001 | Terada |
| 6,299,202 B1 | 10/2001 | Okada et al. |

FOREIGN PATENT DOCUMENTS

| | | | |
|---|---|---|---|
| EP | 0980796 A2 | 2/2000 | |
| JP | 6227353 A | 8/1994 | ................. 280/732 |

*Primary Examiner*—Eric Culbreth
(74) *Attorney, Agent, or Firm*—Tarolli, Sundheim, Covell & Tummino L.L.P.

(57) ABSTRACT

An air bag (10) has a deflated condition stored in a container (40) in a vehicle and has an inflated condition. The air bag (10) when in the inflated condition has lower and upper sections (64, 74). The air bag (10) has a first portion (60) forming the lower section (64) of the air bag, and a second portion (70) forming the upper section (74). The air bag (10) includes a back panel (82) disposed farthest from a vehicle occupant (22) and a front panel (80) disposed closest to the occupant. The first portion (60) of the air bag (10) is folded into a compact shape and stored in a lower portion (62) of the container (40). The second portion (70) of the air bag (10) is rolled into a compact shape and stored in an upper portion (72) of the container (40). The second portion (70) inflates upward and unrolls in a direction away from the occupant (22) so that the front panel (80) is presented toward the occupant. The first portion (60) of the air bag (10) inflates before the second portion (70).

14 Claims, 6 Drawing Sheets

FOLDED AIR BAG

RELATED APPLICATION

This application is a continuation in part of U.S. patent application Ser. No. 09/661,615 filed Sep. 14, 2000, abandoned, by the same inventors, under the same title. Applicants claim the benefit of the filing date of said earlier application for all common subject matter.

BACKGROUND OF THE INVENTION

1. Technical Field

The present invention relates to an inflatable vehicle occupant protection device, such as an air bag. In particular, the present invention relates to an air bag folded in such a manner as to reduce the possibility of adverse loads on a vehicle occupant when the air bag inflates.

2. Description of the Prior Art

It is known to inflate an air bag from a vehicle instrument panel to help protect an occupant of a front passenger seat of a vehicle. In some instances, the occupant may be closer than desired to the instrument panel when the air bag is inflated. The inflating air bag may get caught under the occupant's chin, increasing the neck loads on the occupant caused by the inflating air bag. Therefore, it is desirable to reduce the interaction between the inflating air bag and the occupant's head.

SUMMARY OF THE INVENTION

The present invention is an inflatable air bag for helping to protect an occupant of a vehicle. The air bag has a deflated condition stored in a container in the vehicle and has an inflated condition. The air bag when in the inflated condition has upper and lower sections. The air bag has a first portion forming the lower section of the air bag when the air bag is in the inflated condition, and a second portion forming the upper section of the air bag when the air bag is in the inflated condition. The air bag includes a back panel disposed farthest from the vehicle occupant when the air bag is in the inflated condition and a front panel disposed closest to the vehicle occupant when the air bag is in the inflated condition.

The first portion of the air bag is folded into a compact shape and stored in a lower portion of the container when the air bag is in the deflated condition. The second portion of the air bag is rolled into a compact shape and stored in an upper portion of the container when the air bag is in the deflated condition. The second portion of the air bag inflates upward and unrolls in a direction away from the vehicle occupant upon inflation of the air bag so that the front panel of the air bag is presented toward the vehicle occupant during inflation of the air bag. The first portion of the air bag inflates before the second portion of the air bag.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION OF THE INVENTION

Figure 1:
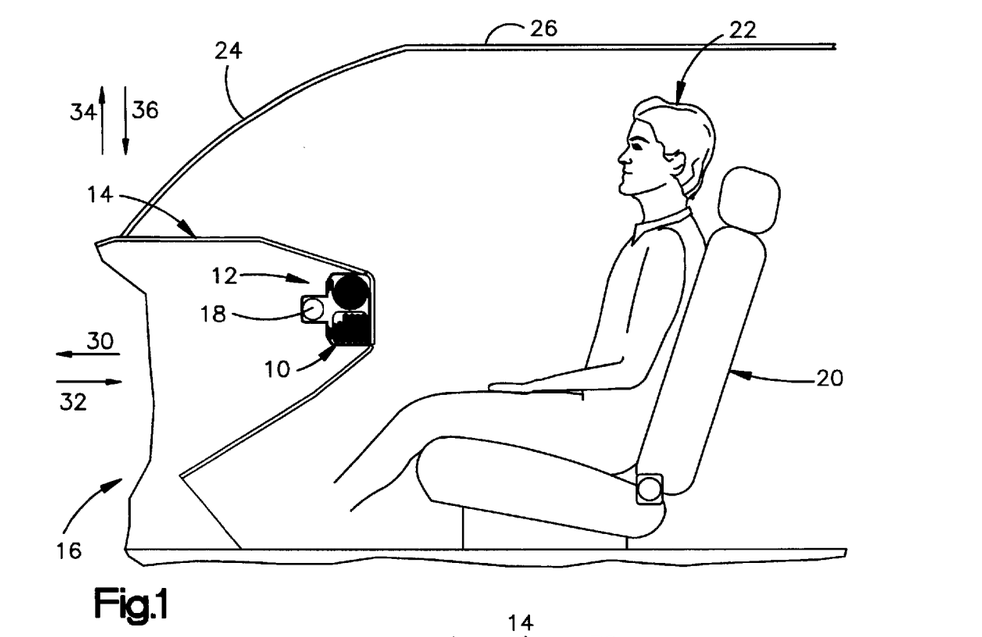
FIG. 1 is a schematic side view of a portion of a vehicle including an air bag in accordance with the present invention, shown in a condition stored in the vehicle instrument panel.

The present invention relates to an inflatable vehicle occupant protection device, such as an air bag. In particular, the present invention relates to an air bag folded in such a manner that when inflating it reduces the possibility of adverse loads on the neck of a vehicle occupant. As representative of the invention, FIG. 1 illustrates an air bag 10 in accordance with a first embodiment of the invention. The air bag 10 forms part of an air bag module 12 mounted in the instrument panel 14 of a vehicle 16. Other inflatable vehicle occupant protection devices that can be used in accordance with the invention include, for example, inflatable head liners or side curtains.

The air bag module 12 also includes an inflator indicated schematically at 18. The inflator 18 preferably contains a stored quantity of pressurized inflation fluid and an ignitable material for heating the inflation fluid. The module 12 alternatively could include an inflator that uses the combustion of gas-generating material to generate inflation fluid in the form of gas to inflate the air bag 10, or an inflator that contains only a stored quantity of pressurized inflation fluid for inflating the air bag.

The vehicle 16 includes a front passenger seat 20. A vehicle occupant 22 is illustrated in a seated position on the seat. The vehicle windshield 24 extends upward and rearward from the instrument panel 14, and merges with the vehicle roof 26. In the vehicle 16, a forward direction is illustrated by the arrow 30, and a rearward direction by the arrow 32. An upward direction in the vehicle is illustrated by the arrow 34, and a downward direction in the vehicle is illustrated by the arrow 36.

The air bag module 12 is mounted in a central (from top to bottom) location in the instrument panel 14, and is thus a "mid-mount" type of module. The air bag module 12 includes a container 40 secured in the instrument panel 14 in a manner not shown. The container 40 includes a main body portion 42 and a door 44. The door 44 is hinged to the main body portion 42 of the container 40 at the top of the container. A tear seam illustrated schematically at 46 releasably connects the bottom edge of the door 44 with the main body portion 42 of the container 40. It should be understood that the container 40 may have a different configuration from the one shown, or may be a portion of the instrument panel 14 itself.

A retaining ring, or retainer, 48 is fixed to the container 40 in a manner not shown. A mouth portion 50 of the air bag 10 is secured to the retainer 48 and, thereby, to the container 40. The mouth portion 50 defines an inflation fluid opening 52 of the air bag 10, through which inflation fluid from the inflator 18 is directed to inflate the air bag.

The air bag 10 has a first portion 60 and a second portion 70. The first portion 60, or lower portion, of the air bag 10 is stored in a lower portion 62 of the container 40. The first portion 60 of the air bag 10, when inflated as described below, forms a first section or lower section 64 (FIGS. 5 and 6) of the air bag. The second portion 70, or upper portion, of the air bag 10 is stored in an upper portion 72 (FIG. 2) of the container 40. The second portion 70 of the air bag 10, when inflated as described below, forms a second section or upper section 74 (FIGS. 5 and 6) of the air bag.

The air bag 10 includes a front panel or contact face 80 (FIG. 6) that is closest to the vehicle occupant 22 when the air bag is inflated, and a back panel 82 that is farthest from the vehicle occupant when the air bag is inflated. The front panel 80 and the back panel 82 are, preferably, separate panels of material sewn together to form the air bag 10. The front panel 80 and the back panel 82 may, alternatively, be two portions of a single panel of fabric material.

The first portion 60 (FIG. 2) of the air bag 10 is folded in a Z-fold configuration to form a group, or stack, 84 of first folded portions 86 of the air bag. The first folded portions 86 of the air bag 10 extend vertically in the lower portion 62 of the container 40. An end portion 88 of the first portion 60 of the air bag 10 merges with the mouth portion 50 and is thereby secured to the retainer 48. The end portion 88 extends between and interconnects the retainer 48 and the stacked first portion 60 of the air bag 10.

Figure 2:
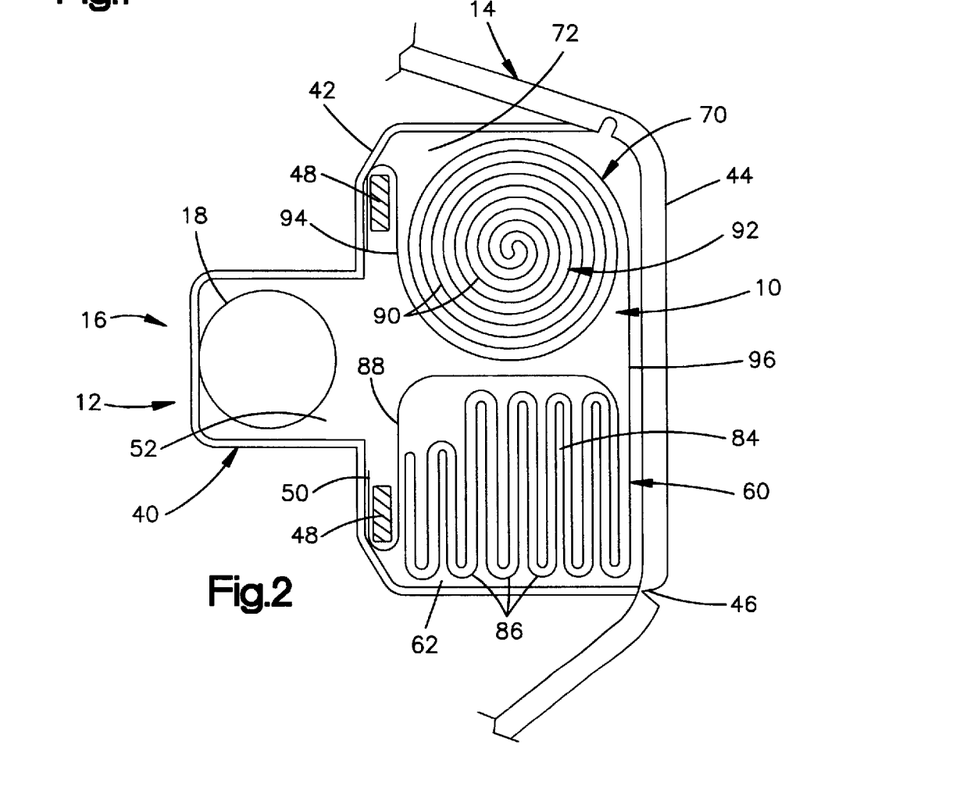
FIG. 2 is an enlarged view of the air bag of FIG. 1 shown in the stored condition.

It should be understood that the illustration of the stack 84 in FIG. 2 is only schematic, and that a larger or smaller number of folded portions 86 of the air bag 10 may be included in the first portion 60 of the air bag as folded. In addition, the folded portions 86 may be stacked so that they extend horizontally, rather than vertically, in the lower portion 62 of the container 40.

The second portion 70 of the air bag 10, when in the stored condition shown in FIG. 2, includes a plurality of layers 90 formed in a roll 92 with succeedingly smaller diameters. The layers 90 define a passage through which inflation fluid from the inflator 18 can flow to inflate the second portion 70 of the air bag 10. An end portion 94 of the second portion 70 of the air bag 10 merges with the mouth portion 50 and is thereby secured to the retainer 48. The end portion 94 extends between and interconnects the retainer 48 and the rolled second portion 70 of the air bag 10.

An intermediate portion 96 of the folded air bag 10 extends between and interconnects the stacked first portion 60 of the air bag and the rolled second portion 70 of the air bag. The roll 92 is configured so that the intermediate portion 96 is disposed on the outside of the roll and extends from the roll along the inside of the door 44. Thus, the intermediate portion 96 is between the roll 92 and the vehicle occupant 22.

FIGS. 3–6 illustrate the inflation of the air bag 10 to help protect the vehicle occupant 22. The occupant 22 is illustrated as leaning forward in the seat 20, relatively close to the vehicle instrument panel 14.

Upon actuation of the inflator 18, the container 40 directs inflation fluid from the inflator into the mouth portion 50 of the air bag. The inflation fluid from the inflator 18 contacts the air bag 10 and causes the air bag to begin to inflate. As the air bag 10 begins to inflate, it pushes open the door 44. The door 44 pivots upward as viewed in FIG. 3. Because the occupant 22 is leaning forward, the door 44 may be caught under the occupant's chin as shown in FIG. 3.

Figure 3:
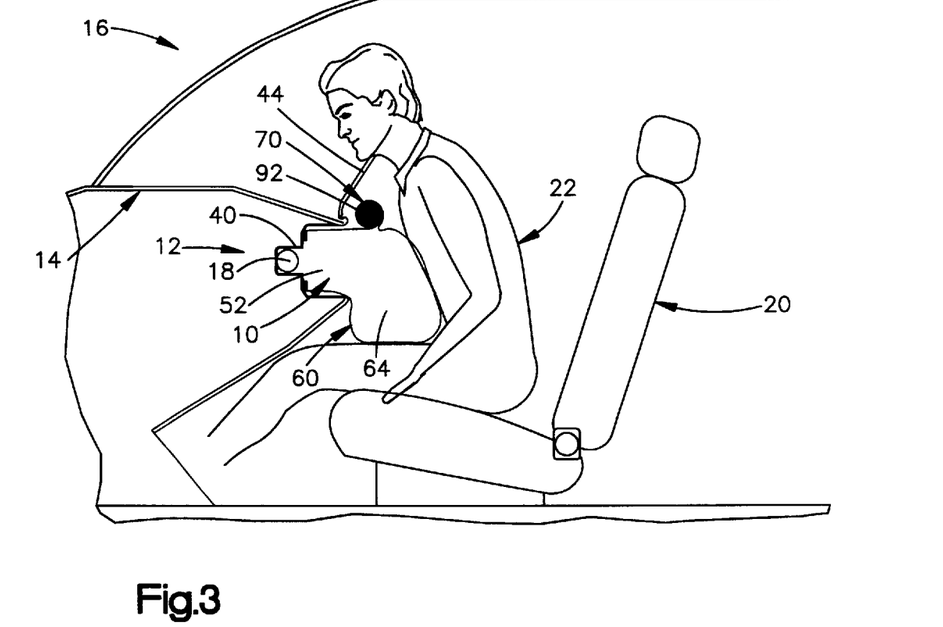
FIG. 3 is a view similar to FIG. 1 showing the air bag in a first partially inflated condition.

The air bag 10 moves from the deflated, folded condition shown in FIG. 1 to a first, partially inflated condition shown schematically in FIG. 3. The inflation fluid from the inflator flows between the roll 92 and the stack 84, into the roll 92, and into the stack 84.

The stacked first portion 60 of the air bag 10 inflates before the rolled second portion 70, because it is easier for the inflation fluid to flow into and expand a Z-folded or pleated portion of an air bag, than a rolled-up portion of an air bag. As a result, unrolling of the roll 92 and inflation of the second portion 70 of the air bag 10 are substantially delayed as compared to unfolding and inflation of the first portion 60. Therefore, as illustrated schematically in FIG. 3, the first portion 60 of the air bag 10 inflates, at least partially, prior to any substantial inflation of the rolled second portion 70 of the air bag. As the first portion 60 of the air bag 10 inflates, it contacts the torso of the occupant 22 and begins to push the occupant in the rearward direction 32 in the vehicle 16, away from the instrument panel 14.

Figure 4:
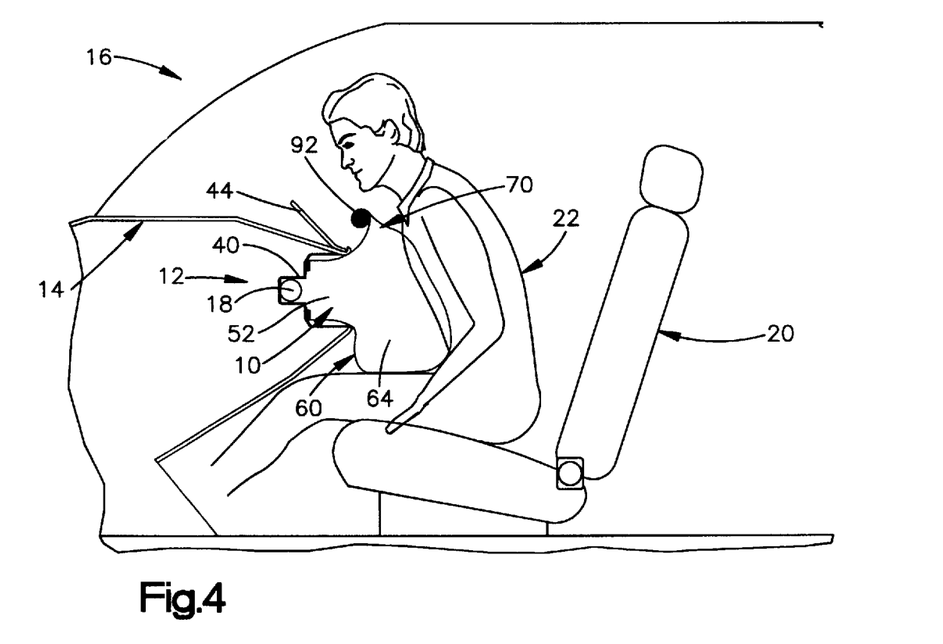
FIG. 4 is a view similar to FIG. 3 showing the air bag in a second partially inflated condition.
Figure 5:
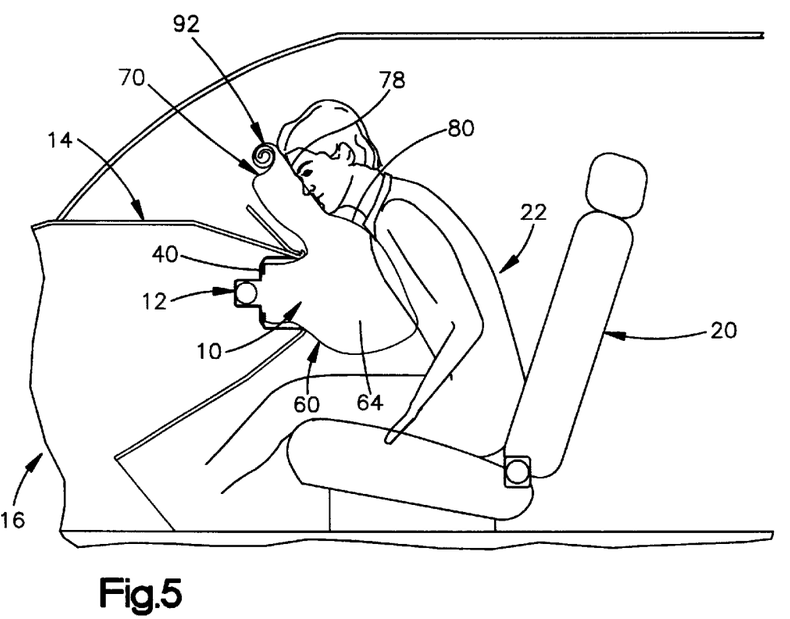
FIG. 5 is a view similar to FIG. 3 showing the air bag in a third partially inflated condition.
Figure 6:
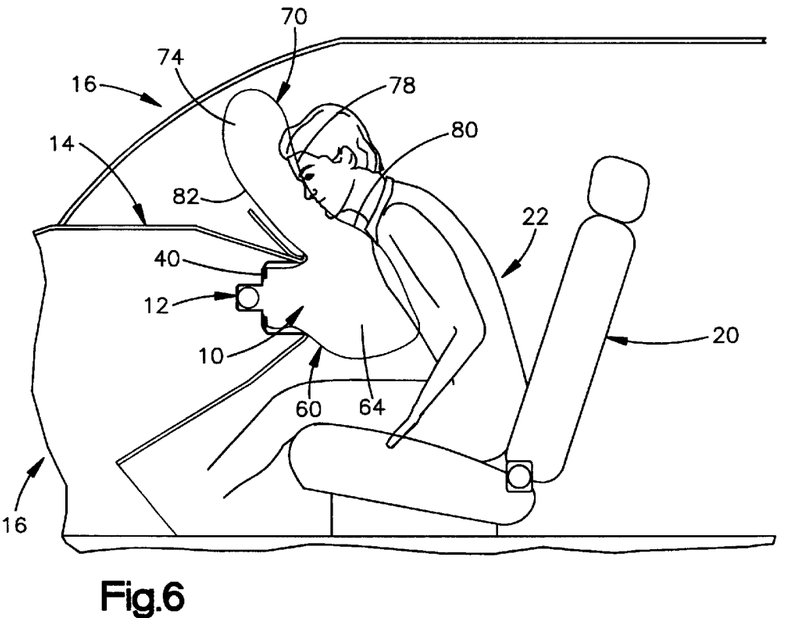
FIG. 6 is a view similar to FIG. 3 showing the air bag in a substantially fully inflated condition.

Eventually, as the air bag 10 inflates more completely, the roll 92 unrolls and inflates as shown sequentially in FIGS. 4–6. Specifically, the door 44 releases from under the occupant's chin, and the rolled second portion 70 of the air bag 10 begins to inflate more, as shown in FIG. 4. The rolled second portion 70 of the air bag 10 continues to unroll in the upward direction 34, as shown in FIG. 5. The second portion 70 of the air bag 10 is the final portion of the air bag to inflate.

Because of the direction in which the material of the second portion 70 of the air bag 10 is rolled, the second portion unrolls away from the occupant 22. Specifically, the rolled layers 90 of the air bag 10 are rolled along the back panel 82 of the air bag, opposite the front panel or contact face 80 of the air bag. The front panel 80 of the air bag 10 is presented toward the vehicle occupant 22 during inflation of the air bag. The front panel 80 of the air bag 10 contacts the head and face of the occupant 22, and the back panel 82 of the air bag does not. Therefore, inflation of the air bag 10 causes the rolled portions 90 to unroll from a side of the air bag 10 opposite the vehicle occupant 22.

The second portion 70 of the air bag 10 unrolls in a clockwise direction (as viewed in FIGS. 3–6) and in a direction away from the vehicle occupant 22, that is, in the forward direction 30 in the vehicle. As a result, the second portion 70 does not scrape across the face of the vehicle occupant 22. Instead, a relatively flat portion 78 of the front panel 80 moves into contact with the head of the vehicle occupant 22, and remains there as the second portion 70 of the air bag 10 continues to unroll. Therefore, the second portion 70 of the air bag 10 is unlikely to get caught under the chin of the vehicle occupant 22.

When the second portion 70 of the air bag 10 unrolls and then inflates fully, it pushes the head of the occupant 22 rearward in the vehicle 16. This action does not create unacceptable loadings on the occupant's neck, because the torso of the occupant 22 is already being moved rearward by the inflated first portion 60 of the air bag 10.

The air bag 10 may be folded into the condition shown in FIG. 2 in a sequence of preliminary folding steps illustrated in FIGS. 7–17. This procedure includes pleating steps, similar to those shown in U.S. Pat. No. 5,636,860, taken prior to the folding and rolling of the lower and upper portions 60 and 70 of the air bag 10.

Figure 7:
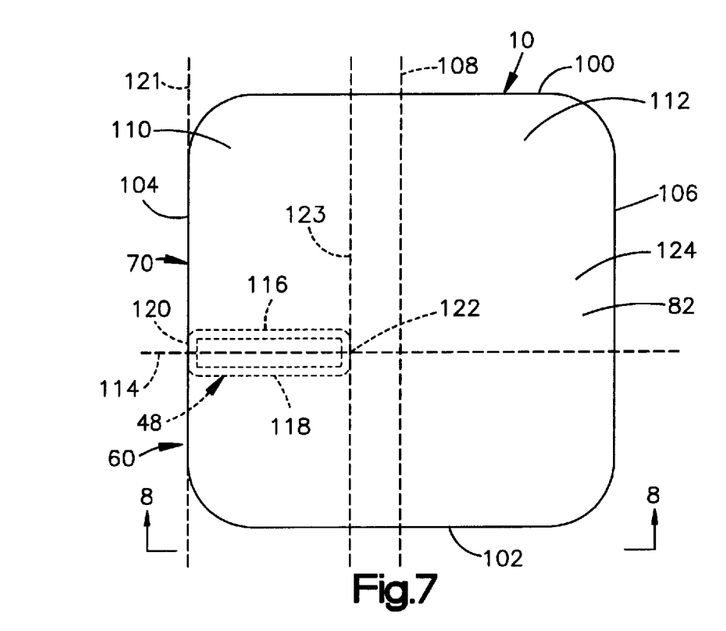
FIG. 7 is a plan view of the air bag shown in an unfolded first condition.
Figure 8:
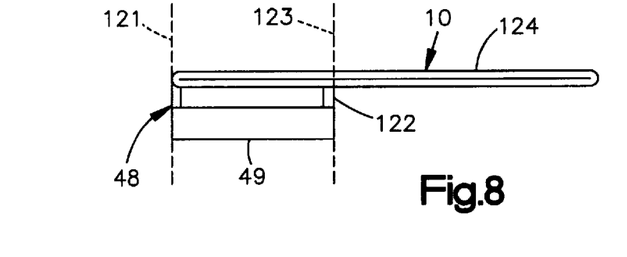
FIG. 8 is a schematic sectional view of the air bag of FIG. 7, taken along line 8—8 of FIG. 7.

The air bag 10 is placed in a first, unfolded condition shown in FIGS. 7 and 8. In this condition, the air bag 10 is collapsed, or laid flat, such that it has a minimum depth (from top to bottom viewed in FIG. 8). The air bag 10 has a height extending between upper and lower edges 100 and 102 and has a width extending between opposite side edges 104 and 106.

The air bag 10 has a top-to-bottom centerline 108 that defines a first side portion 110 of the air bag and a second side portion 112 of the air bag. The air bag 10 has a left-to-right, or inboard-outboard, centerline 114, disposed between the first or lower portion 60 of the air bag and the second or upper portion 70 of the air bag. The retainer 48 is located underneath the air bag 10, supported in a fixture 49. The retainer in this position has opposite top and bottom edges 116 and 118, and opposite left and right side edges 120 and 122. The left and right side edges 120 and 122 of the retainer 48 define imaginary planes 121 and 123 extending upward through the material of the air bag 10.

The air bag 10 is positioned laterally relative to the retainer 48 so that there is little or no material that extends outside the left side edge 120 of the retainer, that is, to the left of the imaginary plane 121 as viewed in FIGS. 7 and 8. All or substantially all of the material of the air bag 10 is positioned either aligned with the retainer 48 (as viewed in FIG. 7, above or below the retainer or overlying it), or extending outside the right side edge 122 of the retainer, that is, to the right of the imaginary plane 123. In this condition, the width of the air bag 10 is substantially greater than the width of the retainer 48.

Figure 9:
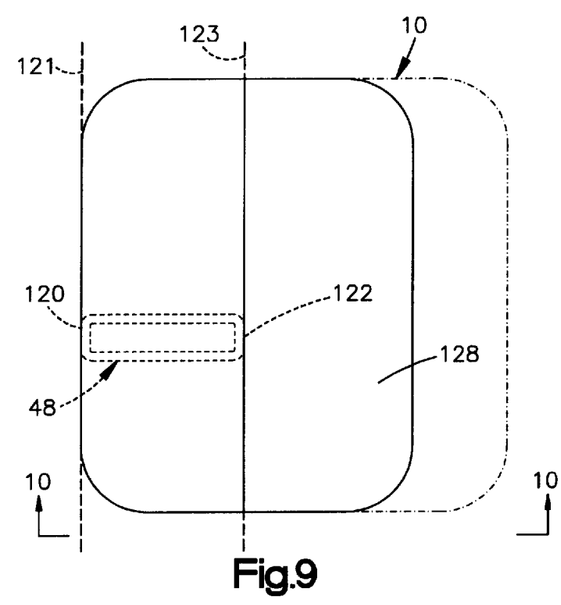
FIG. 9 is a plan view of the air bag shown in a partially folded second condition.
Figure 10:
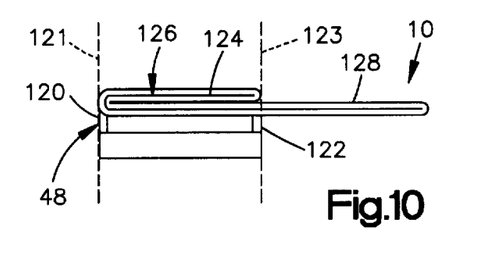
FIG. 10 is an elevational view of the air bag of FIG. 9, taken along line 10—10 of FIG. 9.

The uppermost layer 124 of the air bag 10 that extends outward from the right side edge 122 of the retainer 48 as shown in FIGS. 7 and 8, past the plane 123, is tucked inward in the manner shown in FIGS. 9 and 10, to overlie the retainer and form a first pleat 126. The first pleat 126 preferably extends for substantially the entire width of the retainer 48, between the left side edge 120 of the retainer and the right side edge 122 of the retainer.

Figure 11:
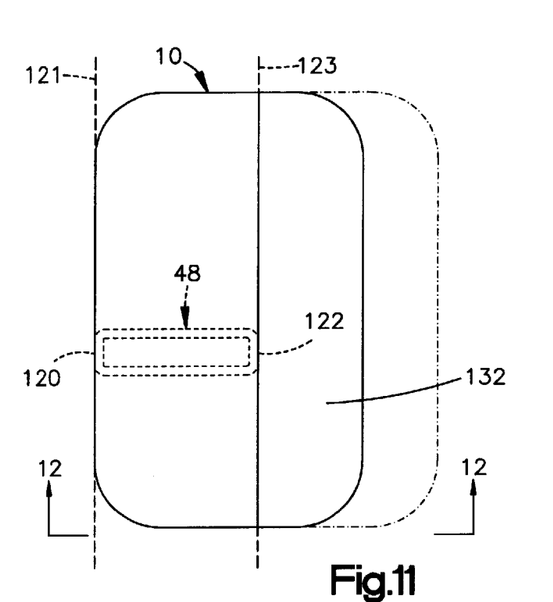
FIG. 11 is a plan view of the air bag shown in a partially folded third condition.
Figure 12:
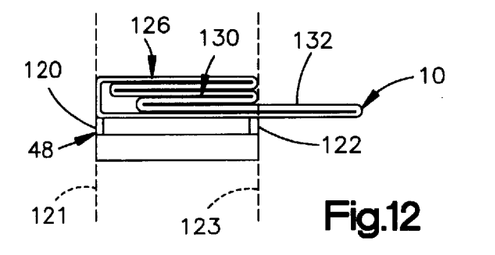
FIG. 12 is an elevational view of the air bag of FIG. 11, taken along line 12—12 of FIG. 11.

Next, the uppermost layer 128 of the air bag 10 that extends outward from the first pleat 126 and from the right side edge 122 of the retainer 48 as shown in FIGS. 9 and 10, past the plane 123, is tucked inward in the manner shown in FIGS. 11 and 12 to underlie the first pleat and form a second pleat 130. The second pleat 130 preferably extends to the right side edge 122 of the retainer 48 but not to the left side edge 120 of the retainer.

Figure 13:
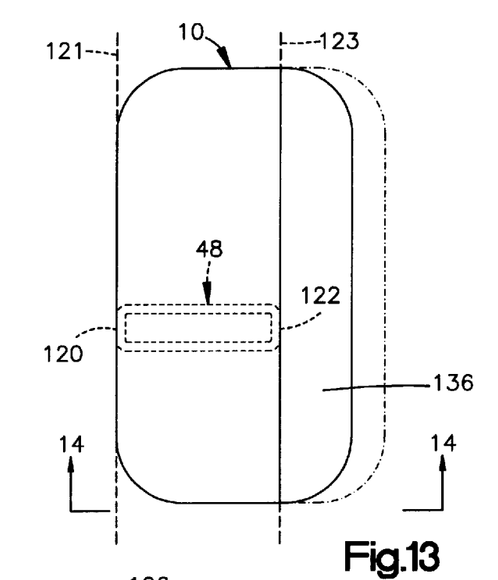
FIG. 13 is a plan view of the air bag shown in a partially folded fourth condition.
Figure 14:
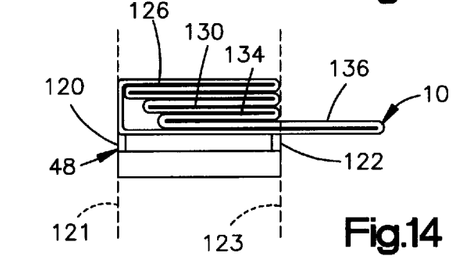
FIG. 14 is an elevational view of the air bag of FIG. 13, taken along line 14—14 of FIG. 13.

Next, the uppermost layer 132 of the air bag 10 that extends outward from the second pleat 130 and from the right side edge 122 of the retainer 48 as shown in FIGS. 11 and 12, past the plane 123, is tucked inward in the manner shown in FIGS. 13 and 14 to underlie the second pleat and form a third pleat 134. The third pleat 134 preferably extends to the right side edge 122 of the retainer 48 but not so far inward as the second pleat.

Figures 15, 16:
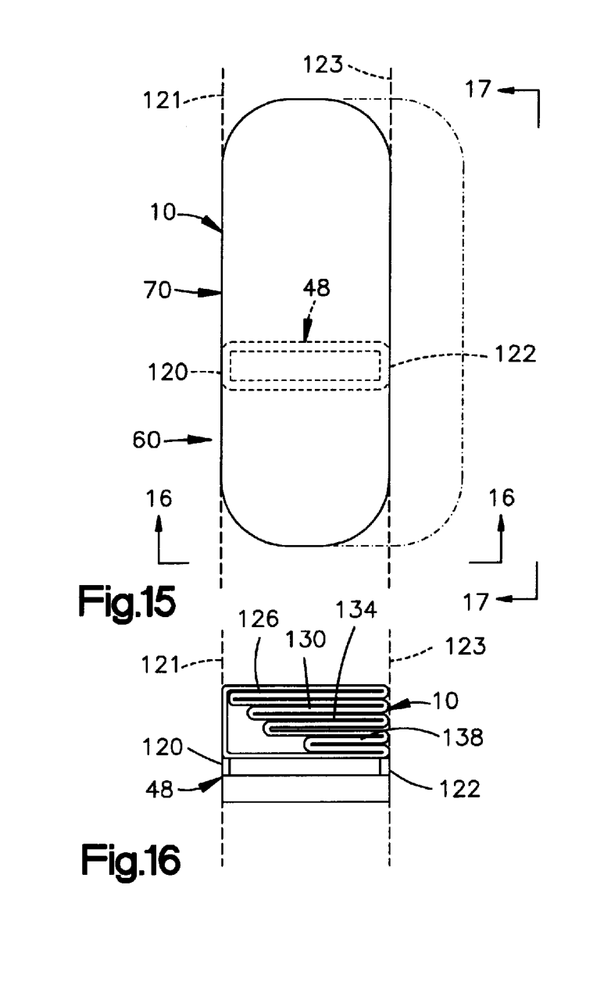
FIG. 15 is a plan view of the air bag shown in a partially folded fifth condition.
FIG. 16 is an elevational view of the air bag of FIG. 15, taken along line 16—16 of FIG. 15.
Figure 17:
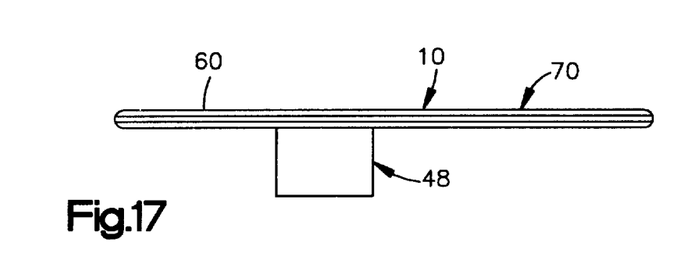
FIG. 17 is another elevational view of the air bag of FIG. 15, taken along line 17—17 of FIG. 15.

In the last pleating step, the remaining part 136 of the air bag 10, extending outward from the third pleat 134 and from the right side edge 122 of the retainer 48 as shown in FIGS. 13 and 14, past the plane 123, is tucked inward in the manner shown in FIGS. 15 and 16 to underlie the third pleat and form a fourth pleat 138. The fourth pleat 138 preferably extends to the right side edge 122 of the retainer 48 but not so far inward as the third pleat 134.

After the last pleating step, the folded air bag 10 has a width substantially equal to, and not significantly greater than, the width of the retainer 48. The partially folded air bag 10 is disposed laterally between the planes 121 and 123. The first or lower portion 60 of the air bag 10 extends below (as viewed in FIG. 15) the retainer 48, and the second or upper portion 70 of the air bag extends above (as viewed in FIG. 15) the retainer. After this initial pleating process is performed to reduce the width of the air bag 10, the lower portion 60 of the air bag is thereafter folded and the upper portion 70 is rolled, in the manner described above, to place the air bag in the condition shown in FIG. 2.

Figure 18:
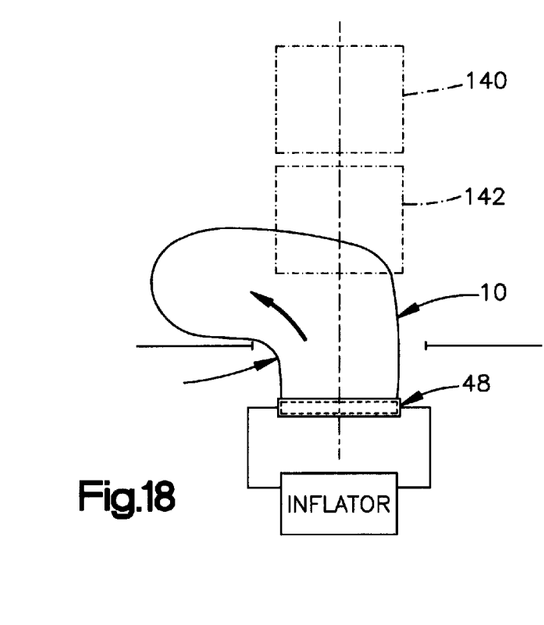
FIG. 18 is a schematic illustration showing inflation of the air bag.

When an air bag 10 that has been folded as shown in FIGS. 7–17 inflates, the air bag inflates outward toward the vehicle occupant as shown schematically in FIG. 18. If the occupant is seated far enough away from the inflator that the air bag 10 can inflate fully before contacting the occupant, as indicated schematically by the block 140, the air bag inflates into a centered condition relative to the retainer, neither inboard nor outboard of the retainer 48. If, on the other hand, the inflating air bag 10 contacts a vehicle occupant, as indicated schematically by the block 142, before fully inflating, the friction between the material of the air bag and the occupant causes the air bag to "stick" to the occupant, and additional inflation fluid flowing into the air bag moves and inflates the pleats 126, 130, 134 and 138 in a sideways direction extending from right to left as viewed in FIG. 18. The inflating air bag 10 is thus moved against and across the occupant predominantly in a sideways direction, limiting the amount of force applied to the occupant.

From the above description of the invention, those skilled in the art will perceive improvements, changes and modifications in the invention. For example, the initial folding procedure could be different; for example, a different number of pleats could be provided, or the pleats could all have the same width, or all extend completely across the width of the retainer. Such improvements, changes and modifications within the skill of the art are intended to be covered by the appended claims.

Having described the invention, we claim:

1. An inflatable air bag for helping to protect an occupant of a vehicle, said air bag having a deflated condition stored in a container in the vehicle and being inflatable into an inflated condition, said air bag when in the inflated condition having upper and lower sections;

said air bag having a first portion forming said lower section of said air bag when said air bag is in the inflated condition, said air bag having a second portion forming said upper section of said air bag when said air bag is in the inflated condition;

said air bag including a back panel disposed farthest from the vehicle occupant when said air bag is in the inflated condition and a front panel disposed closest to the vehicle occupant when said air bag is in the inflated condition;

said first portion of said air bag being folded into a compact shape and stored in a lower portion of said container when said air bag is in the deflated condition;

said second portion of said air bag being rolled into a compact shape and stored in an upper portion of said container when said air bag is in the deflated condition;

said second portion of said air bag inflating upward and unrolling in a direction away from the vehicle occupant upon inflation of said air bag so that said front panel of said air bag is presented toward the vehicle occupant during inflation of said air bag;

said first portion of said air bag inflating before said second portion of said air bag.

2. An air bag as set forth in claim 1 wherein said first portion of said air bag is folded in a Z-fold configuration when said air bag is in the deflated condition, said first portion of said air bag inflating outward toward the vehicle occupant as said air bag is inflated.

3. An air bag as set forth in claim 1 wherein said first portion of said air bag is pleated when said air bag is in the deflated condition.

4. An air bag as set forth in claim 1 wherein said rolled portion of said air bag is rolled along said back panel of said air bag, opposite said front panel of said air bag, and said rolled portion unrolls from a side of said air bag opposite from the vehicle occupant upon inflation of said air bag.

5. An air bag as set forth in claim 1 wherein said first portion of said air bag is folded in a Z-fold configuration when said air bag is in the deflated condition, said first portion of said air bag inflating outward toward the vehicle occupant when said air bag is inflated;

wherein said first portion of said air bag is pleated when said air bag is in the deflated condition; and said second portion of said air bag is rolled along said back panel of said air bag, opposite said front panel of said air bag, and said rolled portion unrolls from a side of said air bag opposite from the vehicle occupant upon inflation of said air bag.

6. An air bag as set forth in claim 1 wherein said first portion of said air bag is stored in a lower portion of the container and said second portion of said air bag is stored in an upper portion of the container when in the deflated condition.

7. An air bag as set forth in claim 6 wherein said second portion of said air bag is rolled along said back panel of said air bag, opposite said front panel of said air bag, and said second portion unrolls from a side of said air bag opposite from the vehicle occupant upon inflation of said air bag.

8. An inflatable air bag for helping to protect an occupant of a vehicle, said air bag having a deflated condition stored in a container in the vehicle and being inflatable into an inflated condition, said air bag when in the inflated condition having upper and lower sections;

said air bag having a first portion forming said lower section of said air bag when said air bag is in the inflated condition, said air bag having a second portion forming said upper section of said air bag when said air bag is in the inflated condition;

said air bag including a back panel disposed farthest from the vehicle occupant when said air bag is in the inflated condition and a front panel disposed closest to the vehicle occupant when said air bag is in the inflated condition;

said first portion of said air bag being folded into a compact shape and stored in a lower portion of said container when said air bag is in the deflated condition;

said second portion of said air bag being rolled into a compact shape and stored in an upper portion of said container when said air bag is in the deflated condition;

said second portion of said air bag inflating upward and unrolling in a direction away from the vehicle occupant upon inflation of said air bag so that said front panel of said air bag is presented toward the vehicle occupant during inflation of said air bag;

said first portion of said air bag inflating at least partially before any substantial inflation of said second portion of said air bag, said first portion of said air bag being folded in a Z-fold configuration to form a stack of first folded portions of said air bag when said air bag is in the deflated condition, said first folded portions extending vertically in said lower portion of said container, said first portion of said air bag unfolding outward toward the vehicle occupant as said air bag is inflated.

9. An air bag as set forth in claim 8 wherein said first portion of said air bag is pleated when said air bag is in the deflated condition.

10. An inflatable air bag for helping to protect an occupant of a vehicle, said air bag having a deflated condition stored in a container in the vehicle and being inflatable into an inflated condition, said air bag, when in the inflated condition, having upper and lower sections;

said air bag having a first portion forming said lower section of said air bag when said air bag is in the deflated condition, a second portion forming said upper section of said air bag when said air bag is in the deflated condition, and a third intermediate portion extending between said first portion and said second portion when said air bag is in the deflated condition;

said air bag including a back panel disposed farthest from the vehicle occupant when said air bag is in the inflated condition and a front panel disposed closest to the vehicle occupant when said air bag is in the inflated condition;

said first portion of said air bag being folded into a compact shape and stored in a lower portion of said container when said air bag is in the deflated condition;

said first portion of said air bag inflating at least partially with inflation fluid contacting said third intermediate portion of said air bag before any substantial inflation of said second portion of said air bag, all of said first portion of said air bag being folded in a Z-fold configuration to form a stack of folded portions of said air bag when said air bag is in the deflated condition, said folded portions extending only vertically in said lower portion of said container, said folded portions and said third intermediate portion forming part of said front panel of said air bag when said air bag is in the inflated condition, said first portion of said air bag unfolding outward toward the vehicle occupant as said air bag is inflated, said second portion of said air bag being rolled into a compact shape and stored in an upper portion of said container when said air bag is in the deflated condition;

said second portion of said air bag inflating upward and unrolling in a direction away from the vehicle occupant upon inflation of said air bag so that said front panel of said air bag is presented toward the vehicle occupant during inflation of said air bag.

11. An inflatable air bag as set forth in claim 8 wherein said air bag is connected with a retainer having a top edge, a bottom edge, and first and second side edges;

said air bag having an unfolded first condition having a width greater than the width of said retainer, said air bag when in the first condition being positioned laterally relative to retainer so that little or none of the material of said air bag extends outside said first side edge of said retainer and substantially all of the material of said air bag is positioned aligned with said retainer or extending outside said second side edge of said retainer;

said air bag being folded from said first condition to a partially folded second condition in which said air bag has a width approximately equal to the width of said retainer, said first portion of said air bag extending below said bottom edge of said retainer and said second portion of said air bag extending above said top edge of said retainer.

12. An inflatable air bag as set forth in claim 11 wherein said air bag when in the second condition is pleated inwardly from said first condition with a plurality of pleats to reduce the width of said air bag.

13. An inflatable air bag as set forth in claim 12 wherein said pleats have at least two different widths.

14. An inflatable air bag as set forth in claim 11 wherein said first portion of said air bag is pleated to reduce its width prior to being folded into a compact shape and stored in a lower portion of said container when said air bag is in the deflated condition, and said second portion of said air bag is pleated to reduce its width prior to being rolled into a compact shape and stored in an upper portion of said container when said air bag is in the deflated condition.

* * * * *